(12) United States Patent
Alakkawi

(10) Patent No.: US 11,403,863 B2
(45) Date of Patent: Aug. 2, 2022

(54) SINGLE COMMAND SYSTEMS AND METHODS FOR GENERATING CODES AND SCANNING ITEMS

(71) Applicant: Mohamad Alakkawi, Darmstadt (DE)

(72) Inventor: Mohamad Alakkawi, Darmstadt (DE)

( * ) Notice: Subject to any disclaimer, the term of this patent is extended or adjusted under 35 U.S.C. 154(b) by 375 days.

(21) Appl. No.: 16/779,931

(22) Filed: Feb. 3, 2020

(65) Prior Publication Data
US 2020/0250423 A1 Aug. 6, 2020

Related U.S. Application Data

(60) Provisional application No. 62/799,817, filed on Feb. 1, 2019.

(51) Int. Cl.
| | |
|---|---|
| *G06K 9/00* | (2022.01) |
| *G06V 20/80* | (2022.01) |
| *G06F 16/245* | (2019.01) |
| *G06F 16/248* | (2019.01) |
| *G06V 20/00* | (2022.01) |
| *G06V 30/10* | (2022.01) |

(52) U.S. Cl.
CPC ............ *G06V 20/80* (2022.01); *G06F 16/245* (2019.01); *G06F 16/248* (2019.01); *G06V 20/95* (2022.01); *G06V 30/10* (2022.01)

(58) Field of Classification Search
CPC ........ G06V 20/80; G06V 20/95; G06V 30/10; G06V 30/142; G06V 2201/02; G06V 20/20; G06F 16/245; G06F 16/248
USPC ........................................................ 382/103
See application file for complete search history.

(56) References Cited

U.S. PATENT DOCUMENTS

| | | | | |
|---|---|---|---|---|
| 8,385,964 B2 * | 2/2013 | Haney | ................... | H04W 4/023 455/457 |
| 8,538,458 B2 * | 9/2013 | Haney | ..................... | H04W 4/50 455/457 |
| 8,549,028 B1 * | 10/2013 | Alon | ................... | G06F 16/9537 707/769 |
| 8,712,441 B2 * | 4/2014 | Haney | ..................... | H04W 4/02 455/518 |
| 8,798,645 B2 * | 8/2014 | Haney | ..................... | H04L 67/22 455/456.2 |
| 8,831,635 B2 * | 9/2014 | Haney | ................... | H04M 1/724 455/456.2 |

(Continued)

FOREIGN PATENT DOCUMENTS

| | | | | |
|---|---|---|---|---|
| CA | 2771721 A1 * | 2/2010 | ............. | G06F 21/88 |
| WO | WO-2011060306 A2 * | 5/2011 | ....... | G06F 17/30082 |

(Continued)

*Primary Examiner* — Mahendra R Patel

(74) *Attorney, Agent, or Firm* — Pete Adams Law, PLLC

(57) ABSTRACT

Systems and methods for identifying and tracing items automatically or with a single command using uniquely coded icons are disclosed. A multifunctional scanning system automatically generates and provides different scannable codes to enable security and traceability for users, articles of manufacture, products, media files and the like. If automatic scanning is activated, the multifunctional scanning system scans each new screen automatically without a command (depending on setting the period of time between each scan, or depending on changes in the screen's display), then sends a request to a server and transmits the captured icon screenshot.

16 Claims, 14 Drawing Sheets

(56) References Cited

U.S. PATENT DOCUMENTS

| | | | | |
|---|---|---|---|---|
| 9,516,052 B1* | 12/2016 | Chauhan | ............... | H04L 43/026 |
| 10,678,866 B1* | 6/2020 | Ranganathan | ........ | G06F 40/197 |
| 11,216,895 B1* | 1/2022 | Schwartz | .............. | G06F 16/248 |
| 2008/0244429 A1* | 10/2008 | Stading | ................. | G06F 16/248 |
| | | | | 707/E17.093 |
| 2015/0170209 A1* | 6/2015 | Smith | ................ | G06Q 30/0267 |
| | | | | 705/14.64 |
| 2016/0012445 A1* | 1/2016 | Villa-Real | ............ | G06Q 20/384 |
| | | | | 705/44 |
| 2019/0236365 A1* | 8/2019 | Speasl | ................... | G06V 20/13 |

FOREIGN PATENT DOCUMENTS

| | | | | |
|---|---|---|---|---|
| WO | WO-2012135796 A1 * | 10/2012 | ........... | G06Q 20/327 |
| WO | WO-2013177631 A1 * | 12/2013 | ............. | G06Q 30/02 |
| WO | WO-2016207875 A1 * | 12/2016 | ......... | G06K 9/00442 |

* cited by examiner

SINGLE COMMAND SYSTEMS AND METHODS FOR GENERATING CODES AND SCANNING ITEMS

CROSS-REFERENCE TO RELATED APPLICATIONS

This is a Nonprovisional U.S. Patent Application under 35 U.S.C. 111. This application claims the benefit of the earlier filing date of Provisional U.S. Patent Application Ser. No. 62/799,817, filed Feb. 1, 2019, titled "LampOScan and LampOCode." By this reference, the entire disclosure, including the specification and drawings is hereby incorporated into the present disclosure as if set forth in their entirety.

BACKGROUND OF THE INVENTION

1. Field of the Invention

The present invention relates to systems and methods for identifying and tracing items. More particularly, the invention relates to systems that automatically scan and embed unique code identifiers on items such as articles of manufacture, media files and the like.

2. Description of Related Art

On the Internet, it is not common for websites, social networks or other software to provide any tracing option for items such as products, or media files such as videos, images or documents after they are uploaded. If a tracing method is implemented, it takes a long time to trace the original creator of an item. There is no efficient method to trace items, to interact with, or to review interactions between other people on items. If an item has a tracing method, it can be changed and manipulated to appear as originating from someone other than the original producer or owner. Searching for the source of products or media files can be stressful and inefficient, often yielding misleading results that are time consuming to sort through.

It is often necessary to conduct multiple time consuming searches to identify and compare similar products or media files. Lack of adequate identification and tracing of items are significant problems in the field. There is a need in the field for an unconventional technological solution to solve these technological problems.

SUMMARY OF THE INVENTION

Systems and methods for identifying and tracing items with a single command using uniquely coded icons are disclosed herein. A multifunctional scanning system automatically generates and provides different scannable codes to enable security and traceability for users, products, and media items.

In a method according to an embodiment, a user creates an account and the system automatically generates an account code. The user may create an account on a website or within a system application on a computing device. Once the account is created on the website or the computing device's system application ("multifunctional scanning system"), the multifunctional system scanner automatically generates a unique account code. Users may upload items from computing devices or cameras to the user's account. Once uploaded, the multifunctional scanning system automatically scans the item to search for any existing code ("icon") embedded on the item. If there is no code found on the item, the multifunctional scanning system automatically generates a unique scannable code and stores the code in a database. The unique scannable code is then embedded to the item. If there is already a code found on the item, the item can only be published on the user's page as shared with a reference to the original owner who was identified by the scan API call to the server. If the shared item is then published, the original owner receives a notification on his account.

In another system and method according to an embodiment, a user who has an account modifies the settings in the account. A user accesses the account settings within the multifunctional scanning system installed on a computing device. The user may adjust the device settings for initiating screenshots and scanning items. One setting option is a manual method, meaning that each time a screenshot of an item is taken on the device using the default means, the screenshot is automatically scanned. Another setting option is a device shake method, enabling a user to choose the number of device shakes that initiates taking a screenshot and scanning an item. Another setting option is a voice command scanning method, enabling a user to record a voice command word or phrase that initiates scanning an item on the screen of the device. Yet another setting option is a floating button method, enabling a user to press a floating button on the screen of the device that initiates taking a screenshot and scanning an item. The manual, device shake, voice command, and floating button methods are all single command methods for scanning and generating codes.

In a further system and method according to an embodiment, a user with an account and the multifunctional scanning system configured on a computing device can implement screenshot and scanning methods. With the multifunctional scanning system activated, a user may view an item with a code on the screen of the computing device. If automatic scanning is activated ("Yes") in the settings, the multifunctional scanning system scans each new screen automatically without a command (depending on setting the period of time between each scan done automatically, or depending on changes in the screen's display), then sends a request to a server and transmits the captured icon screenshot.

If the automatic scanning method is not enabled, the user may use another triggering method (e.g. manual, device shake, voice command, floating button) to take a screenshot (or picture) and scan the screenshot. If an item is external to the computing device and the device has a camera, the user may access a camera shortcut in the multifunctional scanning system. The user can then capture a code using the camera, so that the multifunctional scanning system can scan the code. Once the multifunctional scanning system has scanned the code, the application sends a request to a server while delivering the screenshot and code. The server determines if the code received is an account code or an item code. The server sends a notification to the code owner's account indicating a new scan. The server also sends a response to the user identifying a post model or user model. The multifunctional scanning system then displays the original place of the scanned item with multiple options for the user to choose from. Options include selecting the code owner's account, selecting the item name, or selecting the category or hashtag for the item.

These and other features and advantages will be apparent from reading of the following detailed description and review of the associated drawings. It is to be understood that

DETAILED DESCRIPTION OF EMBODIMENTS

Figure 1A:
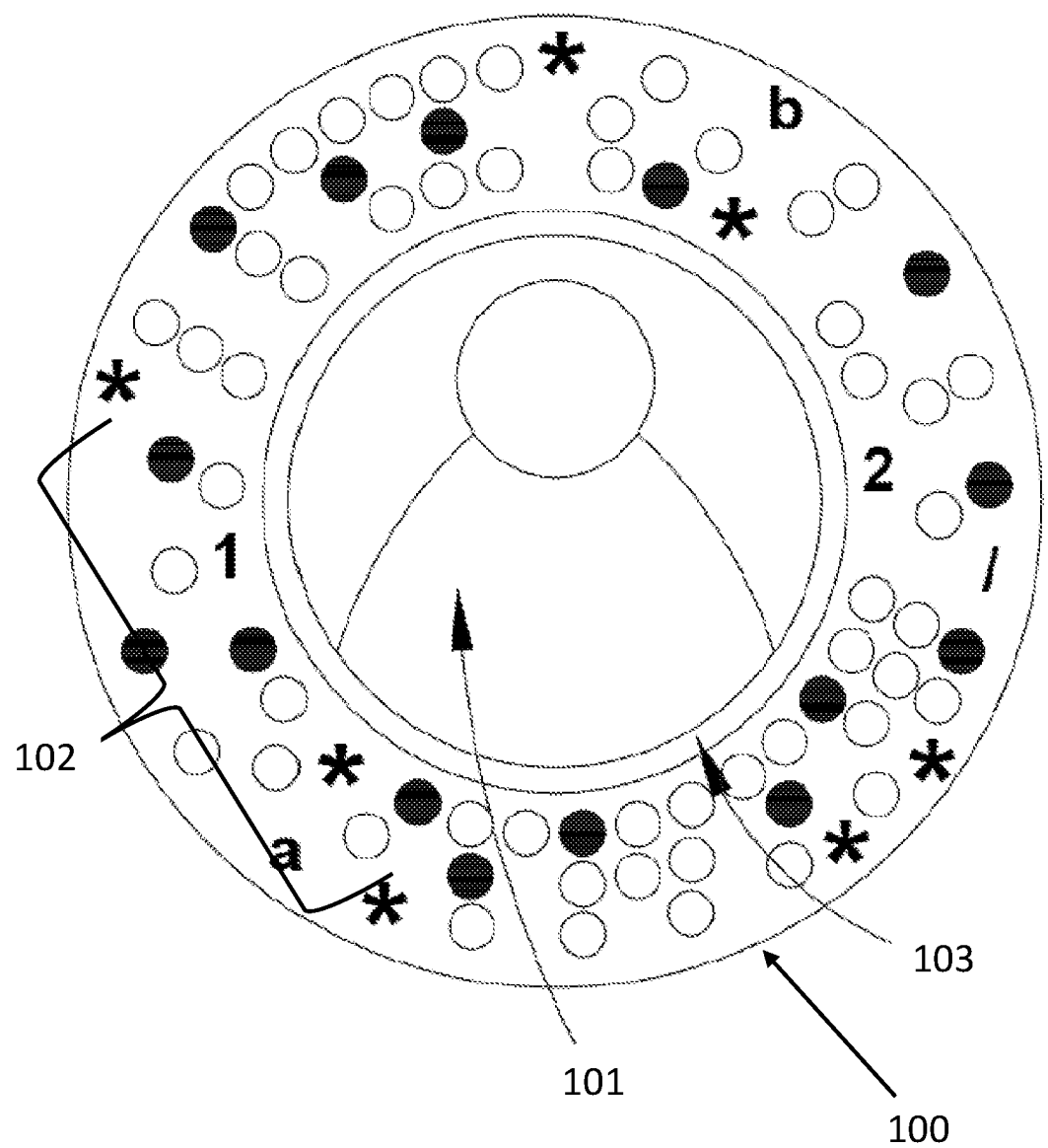
FIG. 1A illustrates an icon with an item code.

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise. In light of the present disclosure, those of ordinary skill in the art should also appreciate that many changes can be made relative to the disclosed embodiments while still obtaining a comparable function or result without departing from the spirit and scope of the disclosure.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable.

Generally, software are program modules include routines, programs, components, data structures, and other types of structures that perform particular tasks or implement particular abstract data types. Moreover, those skilled in the art will appreciate that embodiments may be practiced with other computer system configurations, including handheld devices, multiprocessor systems, microprocessor-based or programmable consumer electronics, minicomputers, main frame computers and comparable computing devices. Embodiments may also be practiced in distributed computing environments where tasks are performed by remote processing devices that are linked through a communications network. In a distributed computing environment, program modules may be located in both local and remote memory storage devices. Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process (es). The computer-readable storage medium a computer-readable memory device. The computer-readable memory device includes a hardware device that includes hard disk drive, a solid state drive, a compact disk, and a memory chip, among others. The computer-read able storage medium can for example be implemented via one or more of a volatile computer memory, a non-volatile memory, a hard drive, and a flash drive.

Throughout this specification, the term platform may be a combination of software and hardware components to provide a communication application or other services. Examples of platforms include, but are not limited to, a hosted service executed over a plurality of servers, an application executed on a single computing device and comparable systems. The term "server" generally refers to a computing device executing one or more software programs typically in a networked environment. However, a server may also be implemented as a virtual server (software programs) executed on one or more computing devices viewed as a server on. the network. More details on these technologies and example embodiments may be found in the following description. A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A user experience may be a visual display associated with an application or service through which a user interacts with the application or service. A user action, such as a user selection refers to an interaction between a user and a user experience of an application or a user experience provided by a service that includes one of touch input, gesture input, voice command, eye tracking, gyroscopic input pen input, mouse input and keyboards input. A tag, as used herein, refers to one of a hashtag and a label. The hashtag may be metadata in the format of a hash character, or number sign, followed immediately by a word or an unspaced phrase, and a label may be any type of categorization tool.

A code may be implemented as a barcode, a QR code, circular code, numbers, shapes, dots, symbols, letters, lines or a combination of two or more types or shapes of codes that can be read and analyzed by a computing device using a scanner, camera or scanning the screen through a software installed within that computing device, that can understand the language in which the code was written with or by matching the code with its original replica in the memory of the main platform it was created by, and then presenting the data associated with the original code.

References to particular proprietary names are made as examples but do not limit the systems and methods disclosed herein. A "computing device" is defined as including mobile phones, smartphones, tablets, laptops, and any other computing device able to support the features described herein. "Media files" are defined as including image files, picture files, video files, live stream video, audio files, text documents and the like. "Items" are defined as including articles of manufacture, other products, media files, and the like. The terms "embed" and "affix" are used interchangeably in the disclosure to describe the same process. The terms "image" and "picture" are used interchangeably in the disclosure to describe the same type of media file. Any "examples" described herein are non-limiting.

An "icon" as described herein refers to a digital image that has code affixed (embedded) to it. An icon can include a profile picture and code surrounding the profile picture. The icon can include an account code or an item code. The item code may also contain categories codes, hashtags codes, payments codes, other user's account's codes, gifts codes, shipments codes, classifications codes, organizing codes, and all types of codes that can identify a process or information about an item. A "multifunctional scanning system" is software that can be installed in a computing device to create account codes, item codes, and various icons for products, pictures, videos, writings advertisement and the like.

With reference to FIG. 1A, there is shown an example of an icon 100 which may be embedded (affixed) to an item. The icon 100 shown includes an account picture 101 and an item code 102 surrounding the account picture 101. The security detector 103 surrounding the account picture 101 is a translucent area that can be used as security insurance to protect the integrity of the icon 100. The security detector 103 is not a code, it is a shape with obvious borders and a translucent filling. The security detector 103 can also have a semi translucent filling. One function is to provide protection for the icon 100 with its translucent filling and obvious borders. For example, the security detector 103 appears translucent when the icon 100 is affixed to an item. If someone attempts to embed other code to mask the original code on an item, the security detector 103 will become non-translucent. In this manner, the security detector 103 can protect the icon 100 from tampering by unauthorized users. An example can be demonstrated in videos or pictures that have an icon 100 which has no translucent filling in its security detector. A user can scan and then report this icon 100 based on suspicion. The customer support for the software can compare this scanned item with the original item the icon 100 was created for and proceed with the proper actions.

The item code 102 is embedded to the icon 100 and the icon 100 as a whole is embedded to an item using code generating software ("multifunctional scanning system)." Different item codes 102 for different items are automatically generated by the multifunctional scanning system when an item is uploaded. As shown, the item code 102 appears as dots, letters, numbers, and symbols. This represents the ability of the multifunctional scanning system to scan letters, symbols, and numbers, in addition to dots. As aforementioned, "items" are defined as including articles of manufacture, other products, media files and the like. Thus, a different item code 102 is automatically generated and affixed to a picture, to a video, to a hashtag, to a text, to a category, to a picture of a product, or any item uploaded on the internet. This process is described in greater detail in reference to the logic flow diagram in FIG. 2.

Figure 1B:
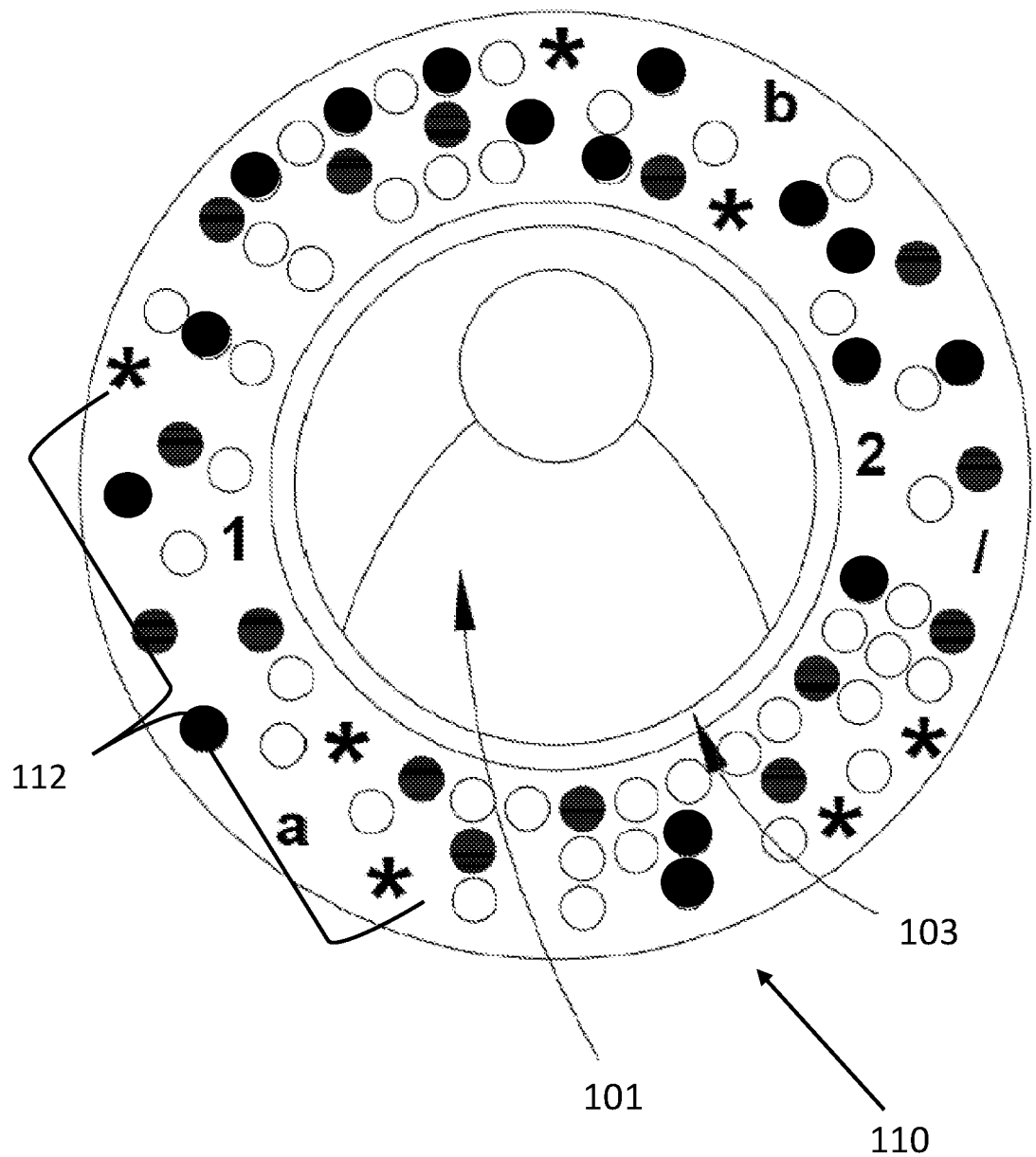
FIG. 1B illustrates an icon with an account code.

Turning to FIG. 1B, there is shown an example of an icon 110. Instead of an item code 102 (FIG. 1A) surrounding the account picture 101, there is an account code 112. Different account codes 112 for different users are automatically generated by a multifunctional scanning system when a user creates an account. When a user uses the multifunctional scanning system to scan an icon 110 with account code 112, the user will be directed to the corresponding account page. The multifunctional scanning system is able to generate an icon 110 by generating an account code 112, an account picture 101, and a security detector 103. This process is described in greater detail in reference to the logic flow diagram in FIG. 2.

An icon 100 generated by software enables users to reach the items they are looking for and interact with them on the internet, reducing the time required for a normal search process. A software system and website provide these icons for users to use them on media files, articles of manufacture, or other products to be authenticated and traceable. The system and method result in an organized registration, classification and safe sharing of contents, products and intellectual properties. This system and method also provide the efficiency required among users to organize these contents and reach them, increasing the income for owners of items and decreasing the loss of fans, interactions, money and reviews. Providing an icon 100 generated by software also aids in establishing communication between the viewers and owners, and between the sellers and the customers, improving collaborations among them and resulting in progressive development of user's experience. Users can share icons 100 with item codes and icons 110 with account codes on the internet. For example, a user can share a video on social media with an icon 100. When any user uses the multifunctional scanning system to scan the icon 100 on the video, he will obtain information about the video including the original owner. In another example, a user can share an icon 110 with his account code 112 on social media or another website. Any user can visit that website and use the multifunctional scanning system to scan that icon 110. That user will be directed to the corresponding account page where he can view information about the account owner, including items they have uploaded.

In an example scenario, a video is created by a user called ("john23") and uploaded on one of the social communication networks. This user has already put his username on the video as a lead to gather other user's subscriptions and views. This interesting video gets downloaded by another user and later get published on another network and then get transferred among other users. One of the viewers find this video interesting and wants to reach it, interact with it or see similar videos. This user will start searching for that video by typing the name ("john20") on one of the search engines provided on the internet. The user will get more than a million results for that search with only one true result. Assuming in the same scenario that the account is found, reaching the video itself among other published items by john20 will take more time. To see other videos or items published by other users that have the same contents will cost even more time. Normally such scenarios are avoided by users because of the large consumption of time. Therefore, john20 will lose views that may bring him extra money through advertisement, extra fans and/or extra interaction, and the viewers will not be able to reach their interests.

The multifunctional scanning system solves all of these problems and shortens the steps required in such searching and reaching processes. Enabling the owner of an item with an account on the multifunctional scanning system to add an icon 100 automatically with a single command will enable the viewers of that material to reach that owner, the item itself, or other items similar to it with only a single scanning command. This simple process is explained in greater detail and shown in FIG. 6 and FIG. 7. Another advantage is adding other users' account codes to the item uploaded if they are participants in that item's creation. Thereby, other participant users can benefit from credits such as money, fame, interactions or scans according to their participation on an item.

Figure 2:
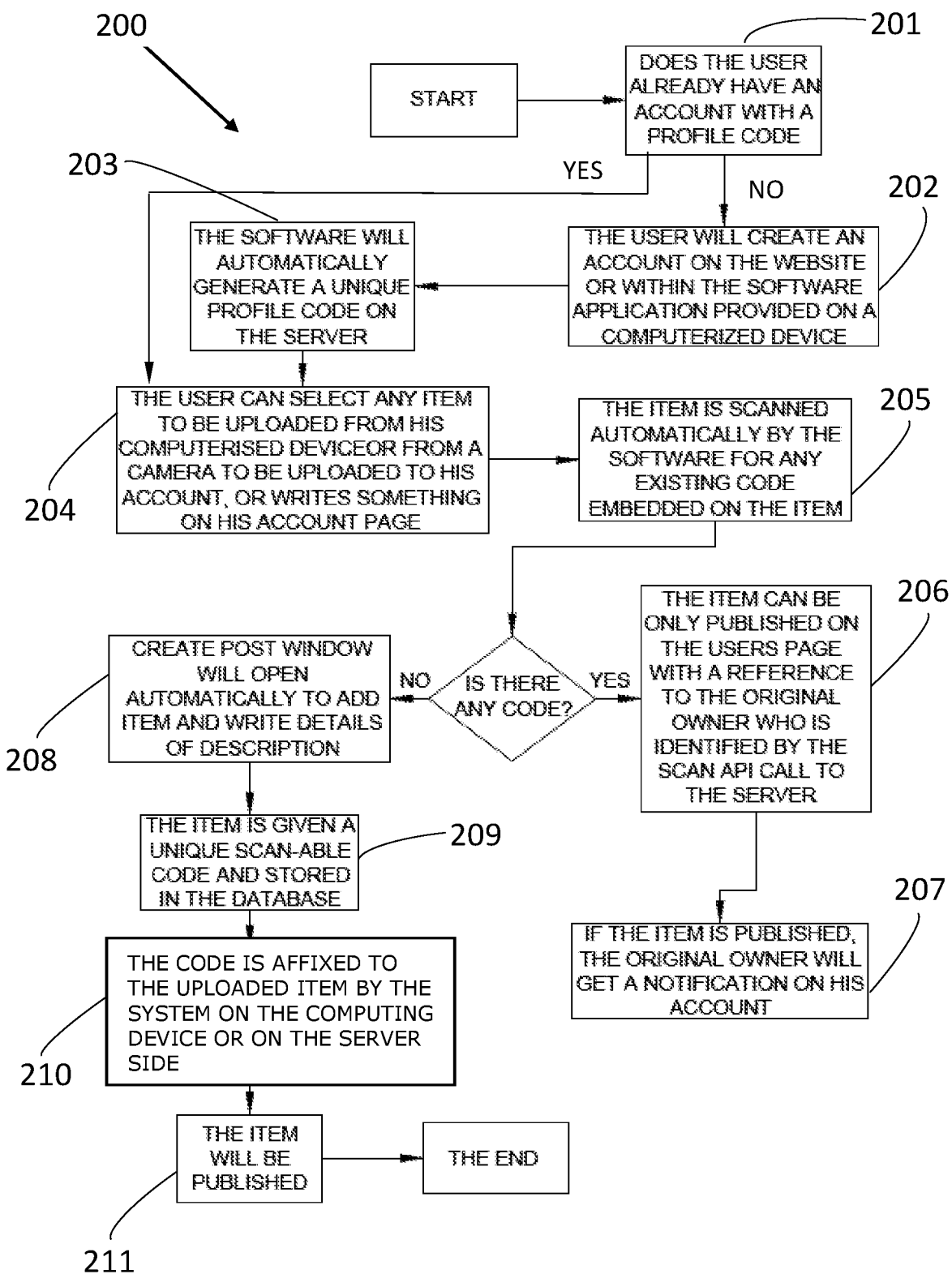
FIG. 2 illustrates a logic flow diagram for a method of a user obtaining a unique account and uploading items to be coded.

Turning to FIG. 2, there is shown a logic flow diagram 200 for a system and method for automatically generating account codes, item codes, and icons. The first step 201 is to determine if the user has an account or needs to create a new account. If the user already has an account, the user logs in to the account on the website or the multifunctional scanning system installed on a computing device. After logging in, the user then proceeds to step 204, described in further detail below. If the user does not have an account, the user can create an account on a website or within a multifunctional scanning system on a computing device (step 202). The user can choose to upload an account picture. Once the account is created on the website or the computing device's multifunctional scanning system, the multifunctional scanning system automatically generates a unique account code and stores the code in a database in the servers as a reference to that account (step 203). The user chooses an original item that belongs to the user such as: a new writing on the account page, an image captured by a camera attached to the computing device, or an item stored in the computing device's storage unit, and then uploads the item using an uploading shortcut on the website or the computing device's multifunctional scanning system (step 204). The multifunctional scanning system automatically searches for any existing code embedded on the item and also searches for any intellectual property assigned to the item (step 205). If there is any code embedded on the item or intellectual property assigned, the user may choose to publish the item on the user's account page as a shared item from the original source, listing a reference to the original owner of the item (step 206). The original owner is identified using a scan API call made to a server (step 206). If the user chooses to publish the item, the original owner receives a notification on his account that the item was published by another user (step 207).

If there is no code or intellectual property found on the item, a window opens on the user's screen enabling the user to name the item, add details and an optional description (step 208). The multifunctional scanning system generates a unique scannable code for the item ("item code") and stores the code in a database in the servers (step 209). The multifunctional scanning system generates an icon 100 (see FIG. 1B) by generating an item code 102, an account picture 101, and a security detector 103, and combining them. The icon 110 (FIG. 1B) is also generated by the multifunctional scanning system by generating an account code 112, an account picture 101, and a security detector 103, and combining them. The user chooses a location (optional) on the item to affix the icon 100. After the location is chosen, the multifunctional scanning system affixes the icon 100 to the item (step 210). The item is then published with the icon 100 included as a component of the item (step 211). Once an item is published with an icon 100, any user of the multifunctional scanning system can trace the item and identify the owner, category, hashtags, and other details regarding the item, or move to similar items with a single command.

Figure 3:
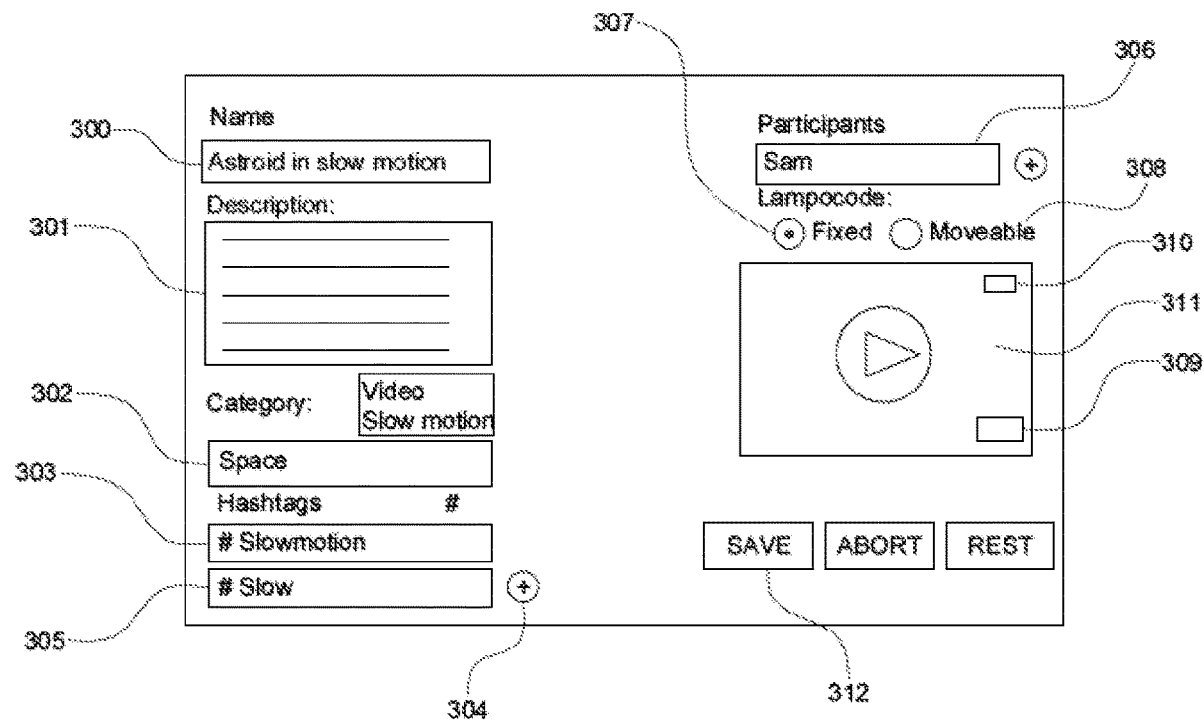
FIG. 3 illustrates an example process of entering information to create an icon to associate it with a specific video item.
Figure 5:
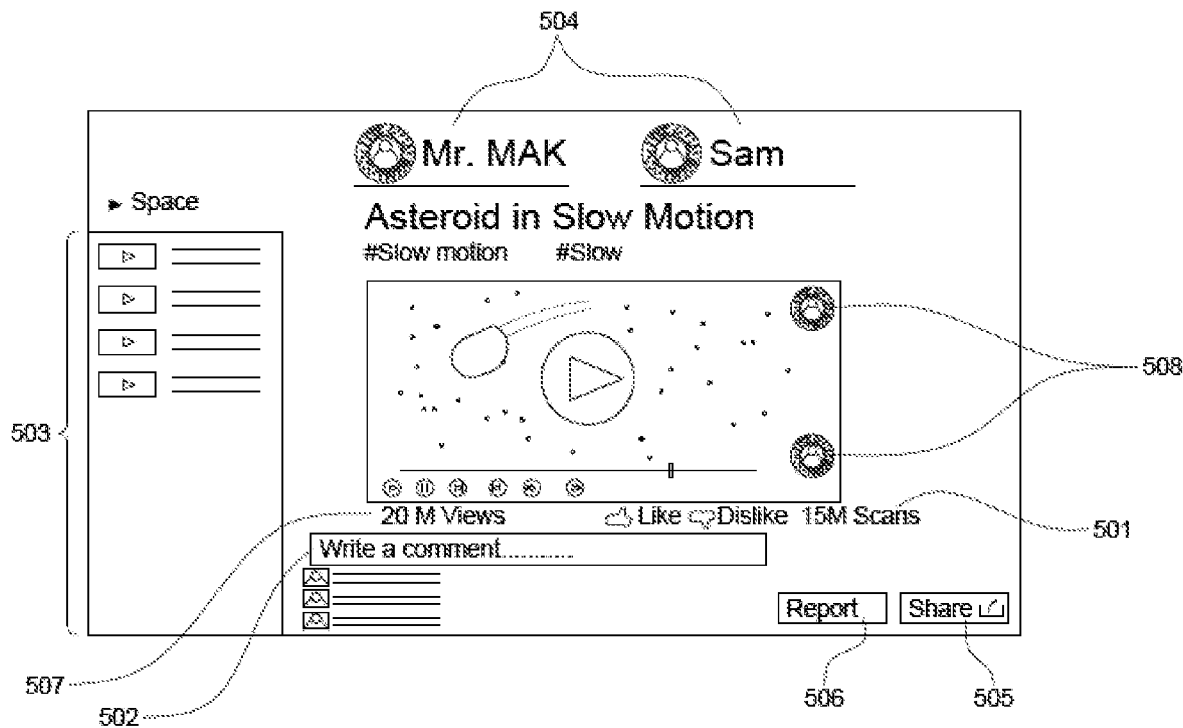
FIG. 5 illustrates an example of user experience that results from publishing the video associated with the icon previously created in FIG. 3.

Turning to FIG. 3, there is shown an example of a user experience regarding the system and method of adding a new icon 100 to a video item by a user of the multifunctional scanning system called "Mr. MAK". After the user ("Mr. MAK") uploaded a video on his account that was made and granted an account code previously, Mr. MAK started by adding a name to the video 300, in this example the video was named ("Asteroid in Slow Motion"). Then, Mr. MAK wrote a description of the video 301. Depending on the description and the name, suggestions in the category field 302 appeared (in which the user can chose from or delete and write a new category). In this example the category chosen was (space). Mr. MAK then wrote a hashtag in the hashtag field 303 which also contained suggestions, in this case the hashtag written was (# slowmotion). The user chose to add another hashtag by selecting the add button (plus) 304. The other hashtag was written by Mr. MAK in the second hashtag square (# slow) 305. Mr. MAK then added in the participant field 306 one of his friend's names (Sam) who had an account as a partner in this video credits. Mr. MAK then chose to make the code fixed, 307 in the video, instead of movable 308. Therefore, two movable squares 309 and 310 on the first shot of the video 311 appeared to set the fixed location of the code, which contains both Mr. MAK's account code and the account code for the participant mentioned, Sam. When Mr. MAK selected Save 312, the video was saved with its details in memory in the multifunctional scanning system, but the video is not published on any account. Next, the multifunctional scanning system servers sent an approval request for Sam to add Sam's account code on the video. After Sam approved the request, the multifunctional scanning system automatically published the video on both Mr. MAK's account and Sam's account. Referring to FIG. 5, the codes created will be embedded to the icon 508 and the icon 508 is affixed to the video. The icon 508 is merely an example of the icon 100 shown in FIG. 1 and includes the same components as previously described.

Figure 4:
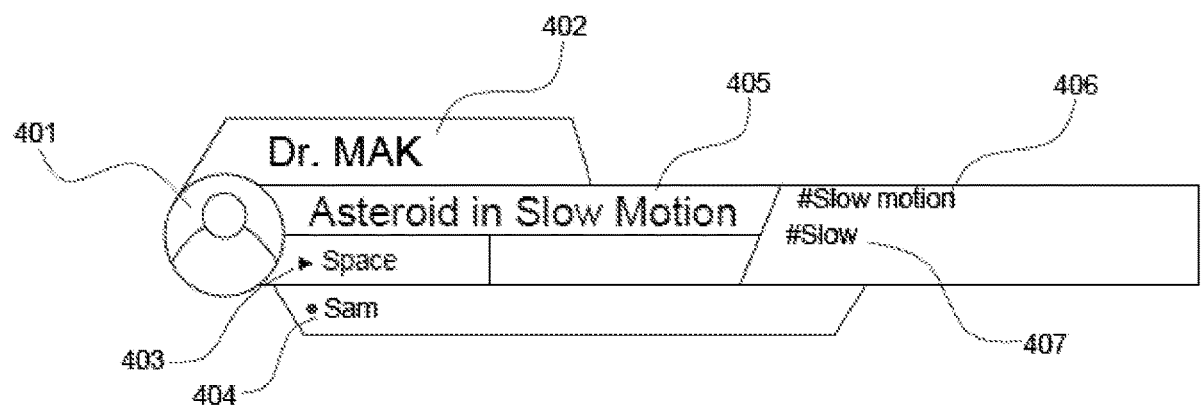
FIG. 4 illustrates the direct result of any scan done by any user on the same video in the previous example of FIG. 3.

Turning to FIG. 4, there is shown an example of the direct results of any scans done by any user on the same example video (Asteroid in Slow Motion) published by the user called Mr. MAK, using a computing device with the multifunctional scanning system installed in it. If a user selects Mr. MAK's picture 401, or the owner's name (Mr. MAK) 402, Mr. MAK's account page will open directly. If a user selects the participant name (Sam) 404, Sam's account page will open. If a user selects the category name (Space) 403, that user will be directed to a page with multiple videos with the same category published by the same user (e.g. Mr. MAK or Sam) or different users. If a user selects one of the hashtags (# slowmotion) 406 or (# slow) 407, that user will be directed to a page in which all the items that have the same hashtag are presented. If a user selects the item name (Asteroid in slow motion) 405, the result is opening the video directly with possibility of further interaction to be done on it, as seen in FIG. 5.

FIG. 5 shows an example of a user experience that results from publishing the video in the previous example (Asteroid in Slow Motion) by the user called Mr. MAK. FIG. 5 may also be the direct result of scanning the same video's item code by any user or as a result of scanning a text that has the item name (Asteroid in Slow Motion) 405. On other computing devices, FIG. 5 can be the result of selecting the name of the item (Asteroid in Slow Motion) 405 from the scanning result. Interactions can be done by any user who has reached this display page. "Scans" 501 show the number of scans done by users on this video's item code. A user can also comment on the video by typing in the comment field 502. A user can check suggested videos on the side suggestions menu 503. A user can also go to one of the item's participants account pages by selecting one of their pictures surrounded by their account's code 504 or name. A user can share the video on any network available by selecting "Share" 505. A user can report this video by selecting "Report" 506. "Views" 507 show the number of views done by users on this video. The owner's (Mr. MAK) item code and the participant's (Sam) item code are permanently affixed (embedded) to the video. The item codes 508 remain affixed to the item regardless of how many times it is downloaded or uploaded through any platform or device.

Figure 6:
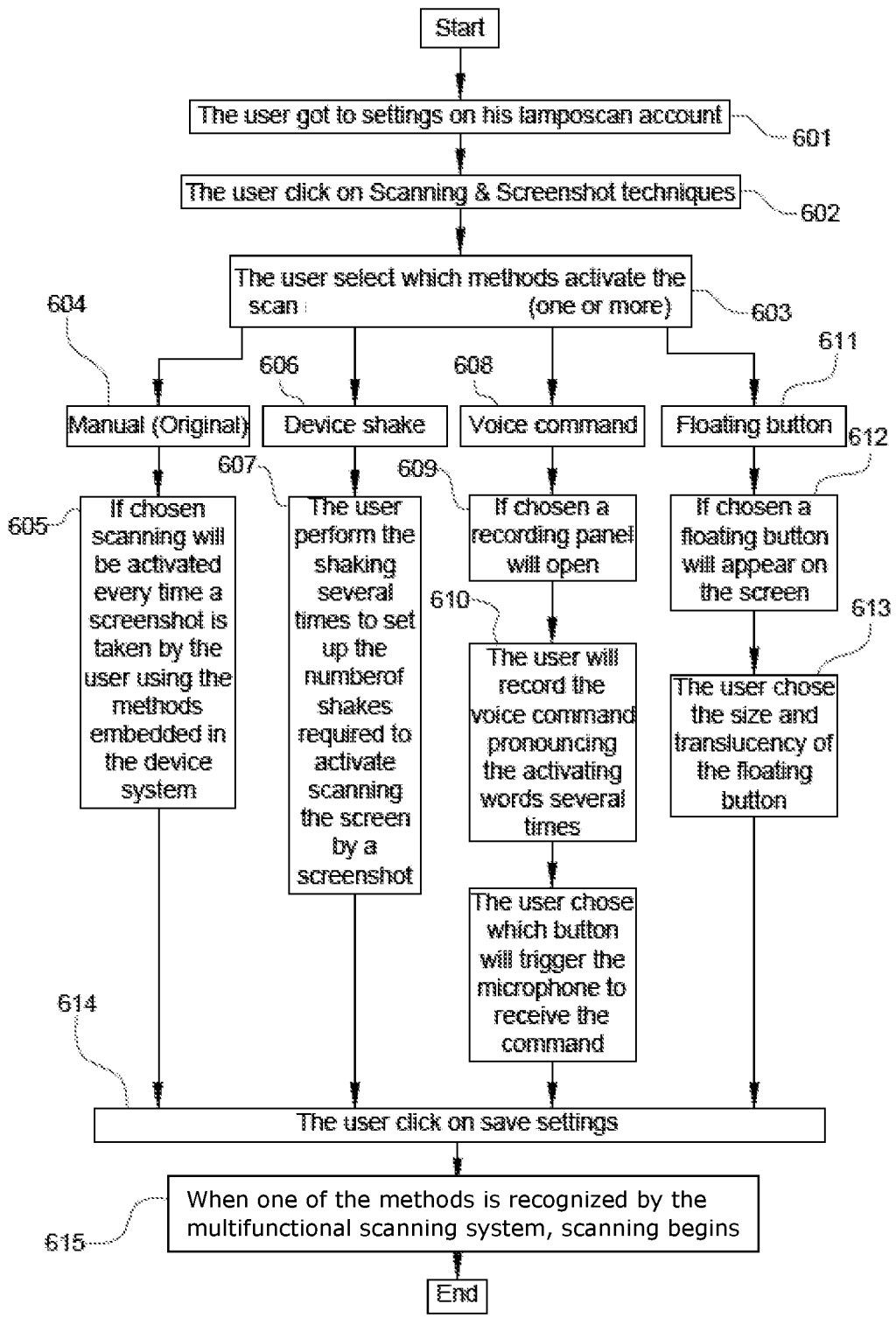
FIG. 6 illustrates a logic flow diagram for an example process for setting up the scanning and screenshot techniques in a multifunctional scanning system installed in a computing device.

Turning to FIG. 6, there is shown a logic flow diagram for an example system and method for setting up "single command" scanning and screenshot techniques. The process starts when the user selects "settings" in the multifunctional scanning system on a computing device 601. The user selects "Scanning & Screenshot" methods 602. Next, the user selects which method will activate taking a screenshot and scanning the screenshot 603. If the user selects "Manual Method" 604, every screenshot taken by the usual way of taking a screenshot in that user's computing device will be scanned automatically 605.

If the user selects "Device Shake Method" 606, then the user can set the number of shakes of the computing device required to start the process of taking a screenshot and scanning it 607. Setting the number of shakes required can be done either by entering the number or performing the shake and the multifunctional scanning system will detect that number automatically. The user can leave it with the default number of shakes which is one.

Another technique to select from is called "Voice Command Method" 608. If this method 608 is activated, a recording panel opens 609, and the user can record the voice command required to activate the scanning process 610. Then, the user selects buttons from that recording panel, and the order of selecting those buttons will be a shortcut to open the computing device's microphone to receive the voice command 610. Another option is for the user is to leave the microphone "open" in the settings, so the microphone can receive voice commands without using buttons.

Another option to select from is the "Floating Button Method" 611. This method is beneficial in case of devices that can not recognize shaking or any of the other methods. When this method 611 is activated, a floating movable button will appear on the screen. When the floating movable button is pressed, the process of taking a screenshot and scanning is activated 612. The user can set the suitable size and translucency of the floating button 613.

The manual method 604, device shake method 606, voice command method 608, and floating button method 611 are all "Single Command" methods for scanning and generating codes. Once the user completes selection of the scanning and screenshot technique settings, the user selects "Save" 614. After saving the settings, each time one of the single command methods is triggered, the multifunctional scanning system will automatically take a screenshot, scan it and present the results of the scan to the user 615.

Figure 7:
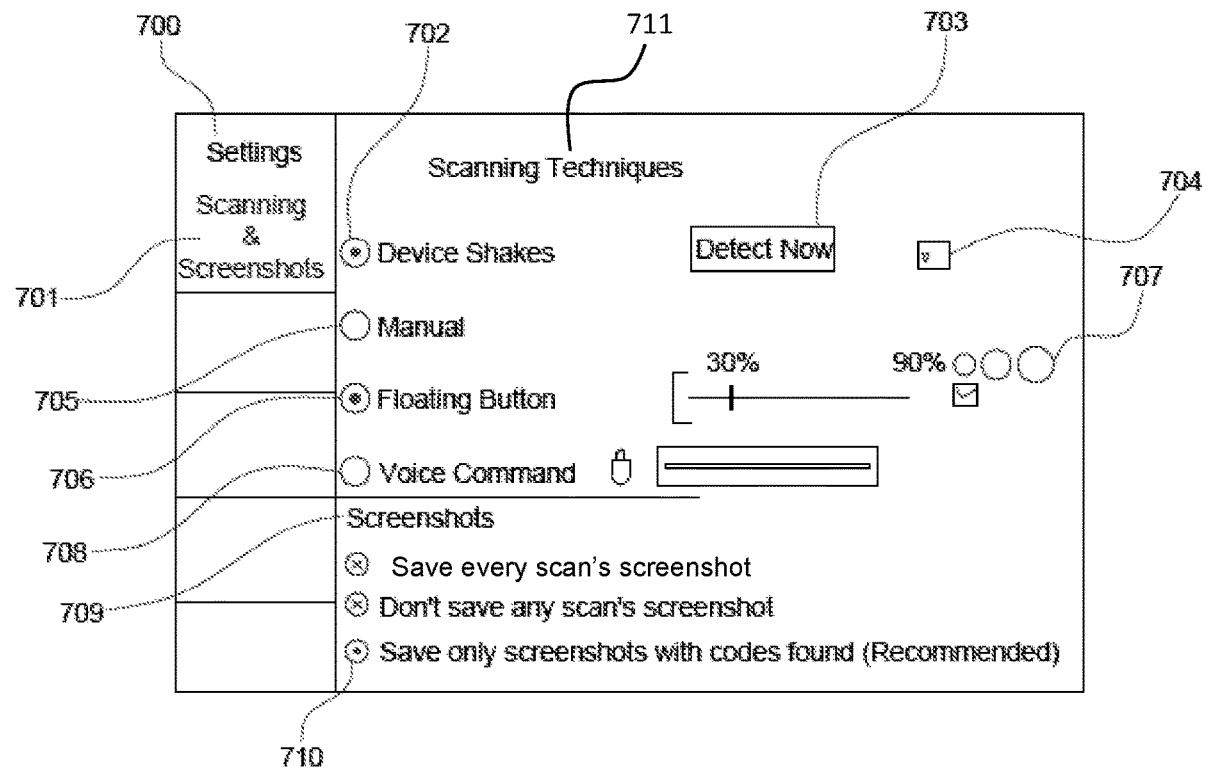
FIG. 7 illustrates a settings panel example for a multifunctional scanning system installed in a computing device.

Turning to FIG. 7, there is shown a "Settings" panel 700 example for the multifunctional scanning system on a computing device. After the user selected the Scanning and Screenshots techniques 701 from the Settings panel 700, the user chose Scanning Techniques 711 to activate the Device Shake method 702. The user can set the number of shakes required to scan by performing the shake after selecting "Detect Now" 703. In this example, the number of shakes implemented by the user and detected by the multifunctional scanning system was "3" shakes 704. Next, the user chose not to activate the Manual Method 705. The next choice for this user was to activate the Floating Button 706, and the user chose to set it's translucency at 30% and the size option 707 as shown in FIG. 7. The user then chose not to activate the voice command 708.

After completing the selections of Scanning Techniques 711, the user selected options from the Screenshots menu 709. The user selected a recommended way for saving the screenshots taken by one or more of these activated scanning techniques: "save only screenshots with codes found in it." The user did not select the options "save every scan's screenshot" or "don't save any scan's screenshot." Lastly, the user saved settings for the Scanning and Screenshots 701 selected. As a result of the saved settings in this example, the multimedia software scanner will take a screenshot and scan it for existing codes every time the user's computing device is shaken three times, or every time the Floating Button is selected. The scanned screenshot will only be saved in that computing device if a code is identified. Any screenshots taken using one of the activated techniques will be deleted directly from the computing device if there are no codes identified. The methods shown in the example of FIG. 7 may be applied to other users and items. Further, when any user of the multimedia software scanner views an item and sees codes affixed to the item, that user can implement a screenshot and scanning command by one of the methods explained previously.

Figure 8:
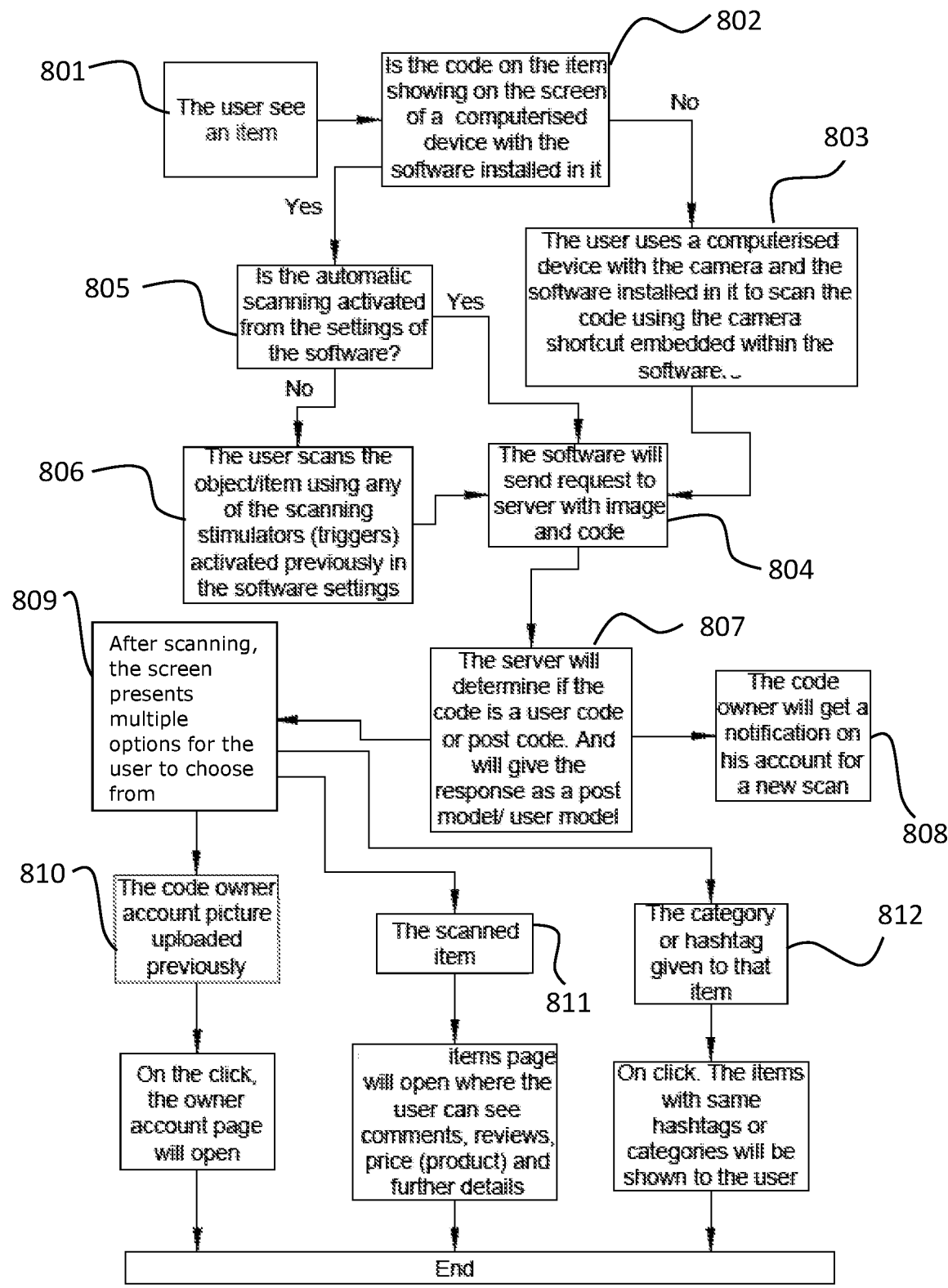
FIG. 8 illustrates a logic flow diagram for an example process of scanning an icon.

Turning to FIG. 8, there is shown a logic flow diagram for an example process of scanning an icon 100 using a computing device. The process of scanning an icon 100 starts after a user sees an item with an affixed icon 100 (step 801). The scanning process is determined by the presence of the item and icon 100 on either a screen or another object outside the screen 802.

If the item and icon 100 are on outside the screen ("No") of a computing device, the user will access the camera shortcut in the multifunctional scanning system for any computing device with a camera included in it (step 803). The multifunctional scanning system's camera detects the icon 100 using that camera (step 803) and the multifunctional scanning system scans the icon image. After scanning, the multifunctional scanning system sends a request to a server and transmits the captured icon image (step 804).

Conversely, if the icon 100 is on the screen ("Yes") of a computing device with the multifunctional scanning system installed in it, the multimedia software scanner will determine if "Automatic Scanning" is activated (step 805). If automatic scanning is activated ("Yes") in the settings, the multifunctional scanning system takes screenshots and scans icons 100 on each screenshot automatically without a command (depending on setting the period of time between each scan done automatically, or depending on changes in the screen's display), then sends a request to a server and transmits the captured icon screenshot (step 804). If automatic scanning is not activated in the settings, the user can take a screenshot of the icon 100 using a method activated in the settings, such as the Manual Method 604, the Device Shake Method 606, the Voice Command Method 608, or the Floating Button Method 611 (step 806). After the chosen method is initiated, the multifunctional scanning system scans the captured screenshot, then sends a request to a server and transmits the captured icon screenshot (step 804).

After the server receives the captured icon image (or screenshot) and the request from the multifunctional scanning system, the server determines if the code embedded to the icon 100 is an account (user) code or item (post) code (step 807). The server will send a response as a post model or user model (step 807). The icon 100 owner gets a notification on his/her account that is also added on the Scan count of that account (step 808). The scanned icon 100 is also going to be saved in the Scan history of the user who initiated the scan.

After the scan history data is recorded for the icon 100 owner and the user who initiated the scan, the multifunctional scanning system directly presents the icon's item inside the owner's account, with several options to choose from on the screen of the computing device (step 809). Among those choices are: 1) the icon owner's picture and name (step 810), 2) the name of the scanned item (step 811), or 3) the category or hashtag names listed for the item (step 812). If the icon owner's picture and name is selected (step 810), the multifunctional scanning system will direct the user to the owner's account page, which lists more information about the owner's item and scanning history. If the name of the scanned item is selected (step 811), the multifunctional scanning system will direct the user to the item's page (within the owner's account). On the item's page, the user may view comments, reviews, price information, and additional details about the item. If the category or hashtag names listed for the item is selected (step 812), the multifunctional scanning system will direct the user to a list of other items that have the same category or hashtag name chosen. If the icon has an account code, the multifunctional scanning system will directly present that account after scanning that coded icon.

Figure 9:
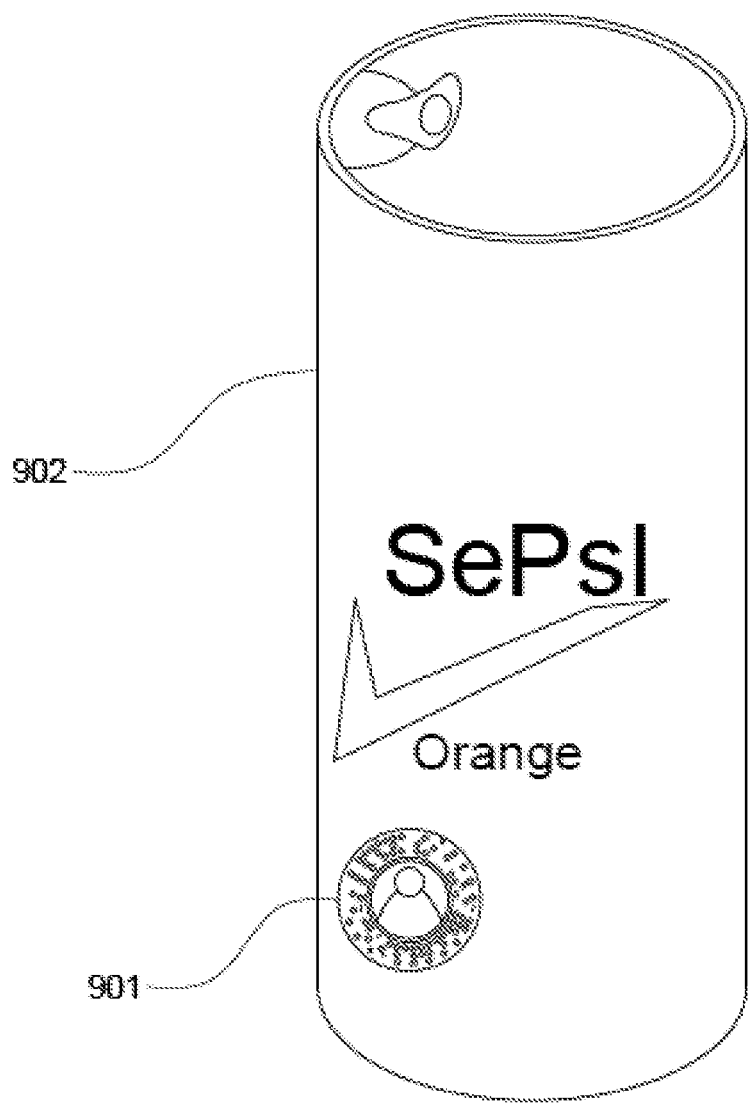
FIG. 9 illustrates an example of affixing an icon 901 on a product.

Turning to FIG. 9, there is shown an example of affixing an icon 901 on a physical item ("product") 902. This icon 901 is an example implementation of the icon 100 previously described. The company SePsI in this example added an icon 901 on one of its products which is called (SePsI Orange) 902. A physical item, which is sometimes called a product or article of manufacture, can have an icon 901 which can be captured by a camera on a computing device and scanned by the multifunctional scanning system.

Figure 10:
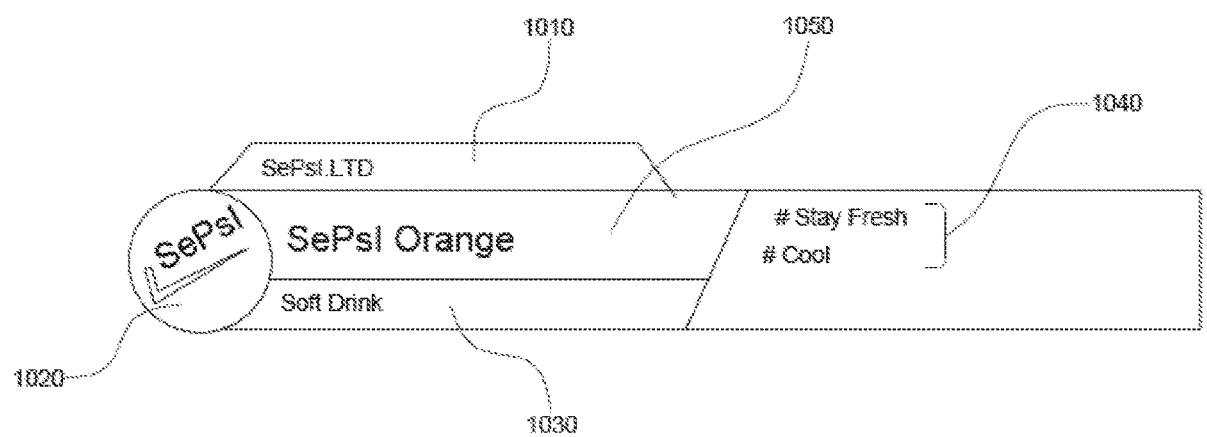
FIG. 10 illustrates an example of a result from scanning the icon on the product in FIG. 9 by a user using a smartphone's camera accessed from the multifunctional scanning system.

Turning to FIG. 10, there is shown an example of a result from scanning the icon 901 on the product 902 in FIG. 9 by a user using a computing device camera accessed from the multifunctional scanning system installed in that device. The scanned result contains the company's name (SePsI LTD) 1010, the company's logo picture 1020, the category of this scanned product (Soft Drink) 1030, the hashtags attached for this product 1040, and this product name (SePsI Orange) 1050.

Figure 11:
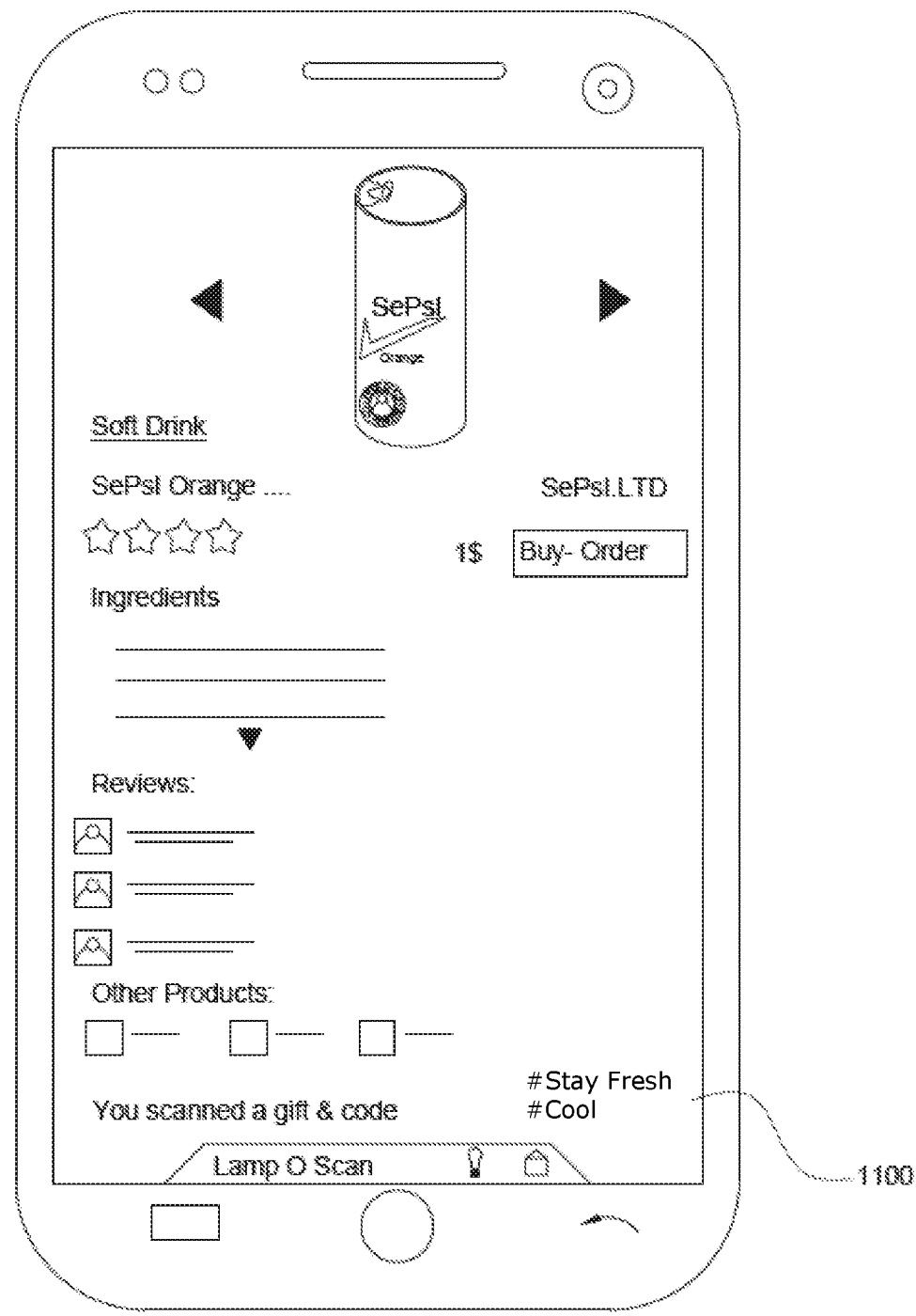
FIG. 11 illustrates an example on a smartphone that resulted from selecting the item name from the scanning result in FIG. 10 for the product shown in FIG. 9.

Turning to FIG. 11, there is shown an example display on a user's smartphone of a direct result of scanning the icon 901 of the product 902 in FIG. 9, using the camera accessed through the multifunctional scanning system installed in that smartphone. A user can get more detailed information about the product 902, interact with this product, or purchase it. For example, a user can interact with hashtags 1100 displayed on the screen. A user can reach other products provided by the same company, or a different company, or different users in the same category, by selecting the category's name 1030 (FIG. 10).

Another function of the multifunctional scanning system is optical character recognition (OCR). The multifunctional scanning system can scan screenshots captured of items such as text images using one of the activated methods described in reference to FIGS. 6-8. "Text images" include text documents, text or symbols on physical items, text or symbols on a computing device screen, and the like. For example, FIG. 11 can also be an illustration of the result of shaking a smartphone with a multifunctional scanning system capable of OCR. When the screen presents a text with the phrase "SePsi Orange" on it without any coded icons, the multifunctional scanning system can use OCR scanning to interpret the text image and convert the text image into computer-editable text.

Figure 12:
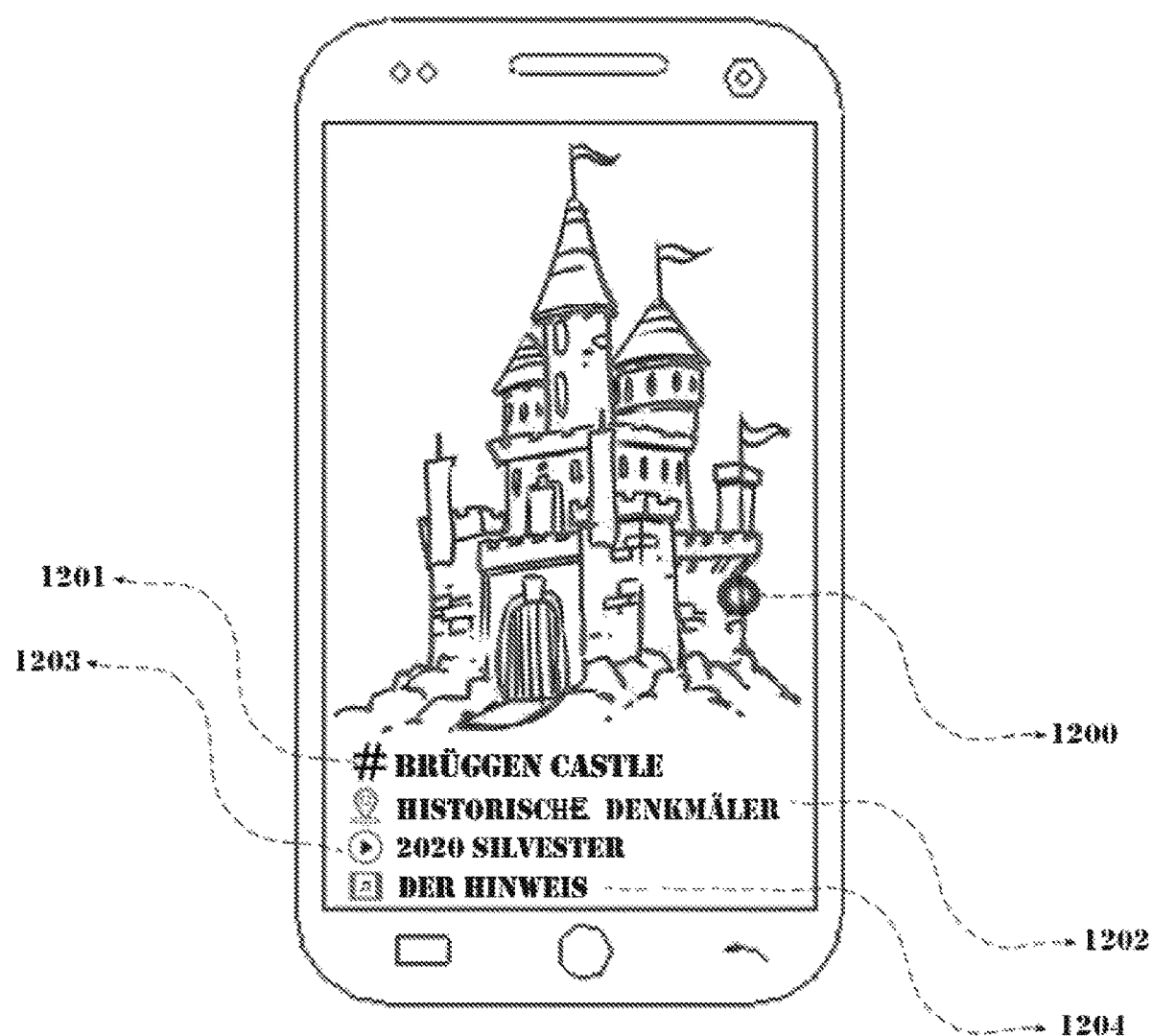
FIG. 12 illustrates a screen of a computing device displaying an image of a castle landmark in a foreign country with symbols and writings.

Turning to FIG. 12, there is shown an example embodiment of the present invention. The screen of a computing device displays an image of a castle landmark in a foreign country with symbols and foreign writings on it. The castle image does not have any scannable codes on it. The screen also displays a floating button 1200, a method enabled by activating option 706 (FIG. 7) to allow for a single command to scan. Once the user initiates the single command method of clicking the floating button to scan the screen, a request will be sent to the server's database which identifies the components of the image, including the symbols and the texts. After the components are detected, the multifunctional scanning system will conduct a search in the server's database to obtain the information about those texts. Then, the multifunctional scanning system will filter the search results according to the symbols detected by the system. The servers will then send the filtered results to the user and present it as a scanning result on the screen, as shown in FIG. 13.

Figure 13:
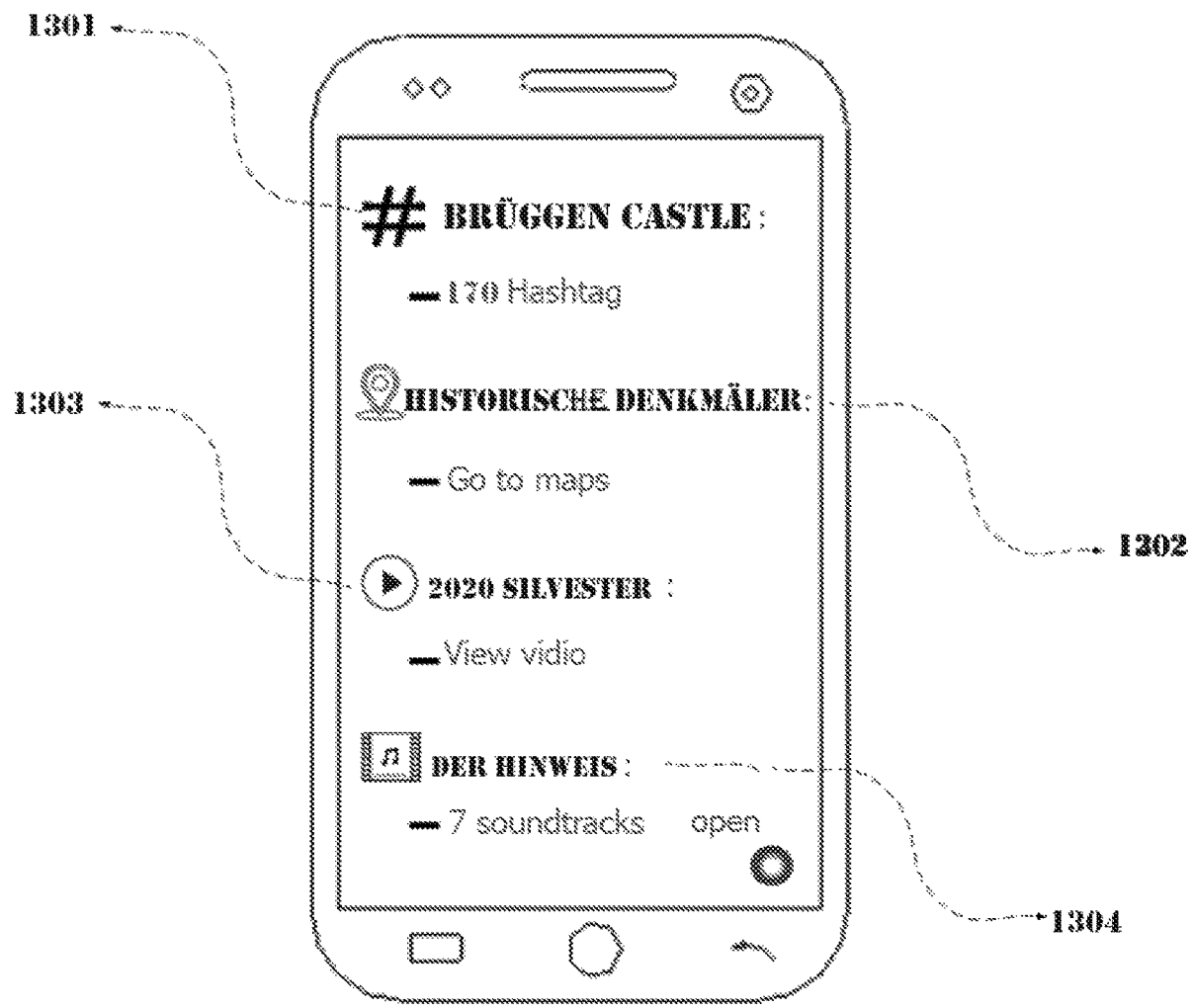
FIG. 13 illustrates a filtered scanning result on the screen of the same computing device in FIG. 12.

FIG. 13 illustrates a filtered scanning result on the screen of the same computing device in FIG. 12. The multifunctional scanning system displays the filtered results to enable a user to access files within the filtered results by clicking on "options" on the screen of the computing device. The option 1301 is the result of filtering the database scanning and searching results to match the hashtag symbol "#" detected in FIG. 12 (1201) by the multifunctional scanning system. If clicked, the user will be able to view all the items and posts that have the same hashtags on the platform. Another option 1302 is presented as a specific location as a result of detecting the location symbol 1202 (FIG. 12) on the screen. A further option 1303 presented by the multifunctional scanning system also results from filtering the scanning result according to the detection of the video symbol 1203 (FIG. 12) and matching the name of the video to the existing names in the server's database. If the user clicks on option 1303 a page will open presenting all videos that have the same name. In case of only one video found in the database with that name ("2020 Silvestre"), the result of clicking option 1303 will be viewing that exact video directly on the screen with a lot of possible interactions. The video's information uploaded by the video owner can be obtained or used by the scanning user.

A further option 1304 presented also results from filtering the scanning result according to the detection of the soundtrack symbol 1204 (FIG. 12) and matching the name of the soundtrack to the existing names in the server database. If the user clicks on option 1304, the soundtrack will play automatically, unless (in another example case) there are other soundtracks that have the same name. In a case of multiple soundtracks found in the server database, the result of clicking option 1304 will be a page with all soundtracks that have the same name.

The multiple scanning results for each mentioned symbol and adjacent statement are also sorted according to the other symbols and adjacent statements, as they are going to be used as categorized key words (by the symbols) to minimize the searching results and sort them accordingly. A good example is the video symbol 1203 (FIG. 12), as one of the choices presented as a result of scanning the image is viewing the video 1303, which is a video that has been chosen among other videos that have the same name ("2020 Silvestre"). This video has been chosen by the system to be the final scanning result because in the database of the servers it has the other scanned mentioned statement and symbols in its description (1201, 1202, 1204). No other video found in the database has the same keywords (1201, 1202, 1204) detected by the scan in its description. Further searching among multiple scanning results may be sorted and searched among by the user through simple settings.

The invention claimed is:

1. A method for identifying and securing an item using a multifunctional scanning system, comprising:
(a) generating, by the multifunctional scanning system, an icon,
wherein the icon comprises an item code, a security detector, and an account picture,
wherein the security detector comprises a form of a shape with a distinct border and a translucent filling or semi translucent filling;
(b) storing the item code in a database;
(c) affixing, by the multifunctional scanning system, the icon to the item;
(d) publishing the item with the affixed icon;
(e) tracing the item;
(f) tracing the affixed icon;
(g) identifying details of the item, wherein the details of the item include: the owner of the item and the exact location of the item;
(h) notifying the owner that the item was published;
(i) automatically generating an account; and
(j) generating, by the multifunctional scanning system, a second icon,
wherein the second icon comprises an account code, a security detector, and an account picture, wherein the security detector comprises a form of a shape with a distinct border and a translucent filling or semi translucent filling.

2. The method of claim 1, wherein the item is an article of manufacture.

3. The method of claim 1, wherein the item is a media file.

4. A system for identifying, securing, and tracing an item, the system comprising:
(a) an icon comprising an item code, a security detector, and an account picture, wherein the security detector comprises a form of a shape with a distinct border and a translucent filling or semi translucent filling;
(b) a computing device comprising one or more processors and one or more memories;
(c) a multifunctional scanning system configured to:
take a screenshot of the item,
scan the screenshot; and
(d) wherein the multifunctional scanning system is further configured to:
generate the item code,
store the item code in a database,
generate and affix the icon to the item,
publish the item with the affixed icon,
trace the item,
trace the affixed icon,
identify details of the item,
wherein the details of the item include: the owner of the item and the exact location of the item;
notify the owner that the item was published; and
(e) wherein the multifunctional scanning system is further configured to automatically take a screenshot of the item and scan the screenshot.

5. The system of claim 4, wherein the multifunctional scanning system is further configured with one or more single command methods to take a screenshot of the item and scan the screenshot.

6. The system of claim 4, wherein the multifunctional scanning system is further configured with a manual method to take a screenshot of the item and scan the screenshot.

7. The system of claim 4, wherein the multifunctional scanning system is further configured with a device shake method to take a screenshot of the item and scan the screenshot.

8. The system of claim 4, wherein the multifunctional scanning system is further configured with a voice command method to take a screenshot of the item and scan the screenshot.

9. The system of claim 4, wherein the multifunctional scanning system is further configured with a floating button method, to take a screenshot of the item and scan the screenshot.

10. The system of claim 4, wherein the item is a text image.

11. The system of claim 10, wherein the multifunctional scanning system uses optical character recognition to scan and convert the text image into computer-editable text.

12. The system of claim 4, wherein the item is an article of manufacture.

13. The system of claim 4, wherein the item is a media file displayed on a screen of a computing device.

14. The system of claim 13, wherein the media file has no item code, and the multifunctional scanning system is further configured with one or more single command methods to take a screenshot of the item and scan the screenshot.

15. The system of claim 14, wherein the multifunctional scanning system is further configured to:
- (a) send a request to the server's database identifying components of the media file, including symbols and texts;
- (b) conduct a search of the server's database to obtain information about the texts;
- (c) filter the results of the search according to the symbols detected by the multifunctional scanning system;
- (f) receive the filtered results from the server;
- (g) present the filtered results on a screen of the computing device; and
- (h) enable a user to access the files within the filtered results by clicking on options on the screen of the computing device.

16. The system of claim 4, wherein the multifunctional scanning system further comprises:
- (a) a camera installed in the computing device and configured to capture an image of the icon;
- (b) a camera shortcut,
  - wherein the camera shortcut enables a user to access the camera; and
- (c) wherein the multifunctional scanning system is further configured to:
  - scan the image of the icon captured by the camera.

* * * * *